US008555311B2

(12) United States Patent  (10) Patent No.: US 8,555,311 B2
Nishimura  (45) Date of Patent: Oct. 8, 2013

(54) METHODS AND DEVICES FOR PRESENTING GUIDE LISTINGS AND GUIDANCE DATA IN THREE DIMENSIONS IN AN INTERACTIVE MEDIA GUIDANCE APPLICATION

(75) Inventor: Akitaka Nishimura, Tokyo (JP)

(73) Assignee: United Video Properties, Inc., Santa Clara, CA (US)

( * ) Notice: Subject to any disclaimer, the term of this patent is extended or adjusted under 35 U.S.C. 154(b) by 909 days.

(21) Appl. No.: 11/961,876

(22) Filed: Dec. 20, 2007

(65) Prior Publication Data

US 2009/0165048 A1  Jun. 25, 2009

Related U.S. Application Data

(60) Provisional application No. 61/014,788, filed on Dec. 19, 2007.

(51) Int. Cl.
  *G06F 3/00*  (2006.01)
(52) U.S. Cl.
  USPC .............................. 725/39; 725/52
(58) Field of Classification Search
  None
  See application file for complete search history.

(56) References Cited

U.S. PATENT DOCUMENTS

| | | | | |
|---|---|---|---|---|
| 5,699,107 | A | * | 12/1997 | Lawler et al. ............. 725/58 |
| 6,331,852 | B1 | * | 12/2001 | Gould et al. ............. 345/419 |
| 6,621,509 | B1 | | 9/2003 | Eiref et al. |
| 6,865,746 | B1 | * | 3/2005 | Herrington et al. ............. 725/53 |
| 7,047,550 | B1 | * | 5/2006 | Yasukawa et al. ............. 725/44 |
| 7,187,847 | B2 | * | 3/2007 | Young et al. ............. 386/83 |
| 7,233,316 | B2 | * | 6/2007 | Smith et al. ............. 345/157 |
| 7,685,619 | B1 | * | 3/2010 | Herz ............. 725/52 |
| 2003/0084445 | A1 | | 5/2003 | Pilat |
| 2006/0253802 | A1 | * | 11/2006 | Kim ............. 715/836 |

FOREIGN PATENT DOCUMENTS

| | | |
|---|---|---|
| EP | 1993287 | 11/2008 |
| JP | 2006-166435 A | 6/2006 |
| JP | 2007-180966 | 7/2007 |
| WO | WO 2007/099803 | 9/2007 |

OTHER PUBLICATIONS

International Search Report dated Jan. 29, 2009 in PCT/US2008/012080.

* cited by examiner

*Primary Examiner* — Brian Pendleton
*Assistant Examiner* — Jason K Lin
(74) *Attorney, Agent, or Firm* — Ropes & Gray LLP

(57) ABSTRACT

Methods and devices for presenting guide listings and guidance data in three dimensions in an interactive media guidance application are provided. In some embodiments, methods for presenting guide listings and guidance data in three dimensions in an interactive media guidance application are provided, the methods comprising: presenting guide listings in a two-dimensional configuration; receiving a user selection of at least one of the guide listings in the two-dimensional configuration; identifying guidance data related to the selection; and presenting the guidance data so that the guidance data appears to be in a third dimension relative to the two-dimensional configuration.

46 Claims, 8 Drawing Sheets

METHODS AND DEVICES FOR PRESENTING GUIDE LISTINGS AND GUIDANCE DATA IN THREE DIMENSIONS IN AN INTERACTIVE MEDIA GUIDANCE APPLICATION

This application claims the benefit of U.S. Provisional Application No. 61/014,788, filed Dec. 19, 2007, the disclosure of which is hereby incorporated by reference herein in its entirety.

BACKGROUND OF THE INVENTION

Due to the overwhelming volume of media content (e.g., television shows) available to the average person (e.g., via cable or satellite television), interactive media guidance applications, such as interactive program guides, have gained widespread popularity. Typically, these guidance applications present guide listings in a two-dimensional grid indexed by time and source (e.g., a television channel).

Because of the limited space available in these two-dimensional grids, the volume of information that can be presented to a user of the guidance application is also limited.

Accordingly, it is desirable to present information to a user in a third dimension with respect to the two-dimensions of an interactive media guidance application.

SUMMARY OF THE INVENTION

Methods and devices for presenting guide listings and guidance data in three dimensions in an interactive media guidance application in accordance with various embodiments of the present invention are provided. In some embodiments, methods for presenting guide listings and guidance data in three dimensions in an interactive media guidance application are provided, the methods comprising: presenting guide listings in a two-dimensional configuration; receiving a user selection of at least one of the guide listings in the two-dimensional configuration; identifying guidance data related to the selection; and presenting the guidance data so that the guidance data appears to be in a third dimension relative to the two-dimensional configuration.

In some embodiments, devices for presenting guide listings and guidance data in three dimensions in an interactive media guidance application are provided, the devices comprising: processing circuitry that: causes guide listings to be presented in a two-dimensional configuration; receives a user selection of at least one of the guide listings in the two-dimensional configuration; identifies guidance data related to the selection; and causes the guidance data to be presented so that the guidance data appears to be in a third dimension relative to the two-dimensional configuration.

In some embodiments, devices for presenting guide listings and guidance data in three dimensions in an interactive media guidance application are provided, the devices comprising: means for causing guide listings to be presented in a two-dimensional configuration; means for receiving a user selection of at least one of the guide listings in the two-dimensional configuration; means for identifying guidance data related to the selection; and means for causing the guidance data to be presented so that the guidance data appears to be in a third dimension relative to the two-dimensional configuration.

DETAILED DESCRIPTION OF VARIOUS EMBODIMENTS

Figure 1:
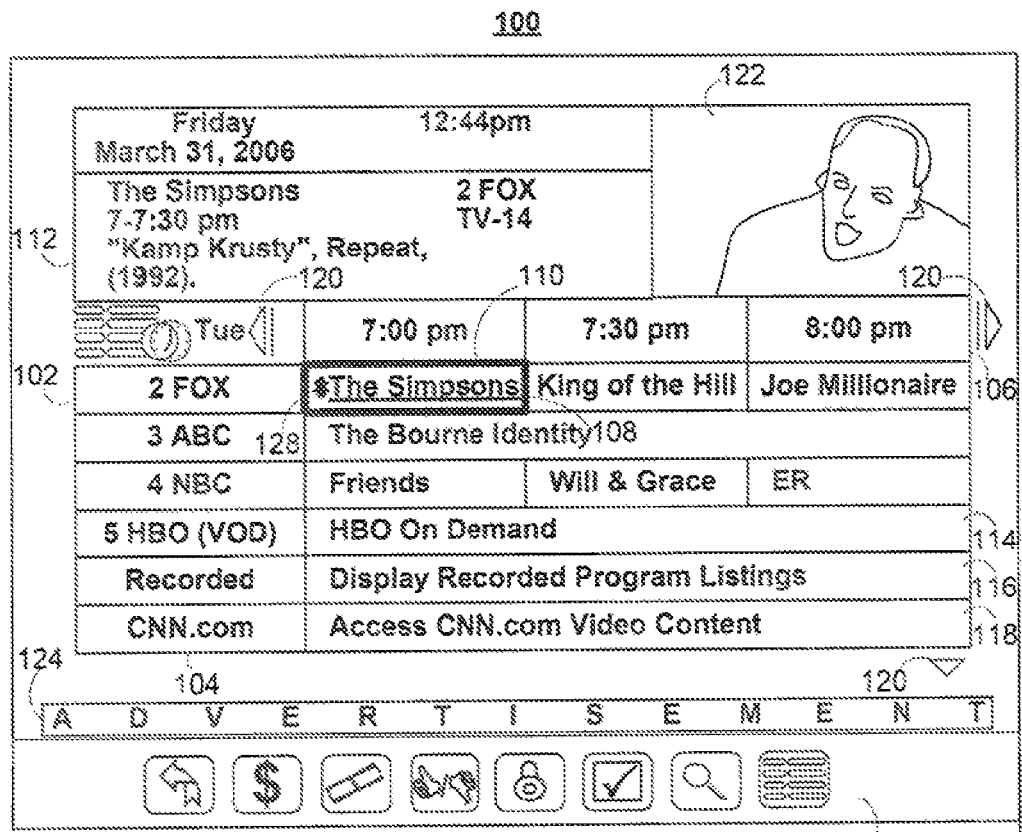
FIG. 1 illustrates an example of a grid display in an interactive media guidance application in accordance with some embodiments of the present invention.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content (which may be referred to herein as "programs" or "programming") including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications may also allow users to navigate among and locate content related to the video content including, for example, video clips, articles, advertisements, chat sessions, games, etc.

With the advent of the Internet, mobile computing, and high-speed wireless networks, users are accessing media on personal computers (PCs) and other devices on which they traditionally did not, such as hand-held computers, personal digital assistants (PDAs), mobile telephones, vehicle entertainment systems, or other mobile devices. On these devices users may be able to navigate among and locate the same media available through a television. Consequently, media guidance may be necessary on these devices as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

One of the functions of the media guidance application is to provide media guidance data (also referred to herein as "program guidance data" and "guidance data") such as media listings (also referred to herein as "program listings," "program guide listings," and "guide listings") and media information (also referred to herein as "program information" and "guide information") to users. Media guidance data may include, for example, media listings (or program listings), media-related information (or media information or program information) (e.g., broadcast times, broadcast channels, media titles, media descriptions, ratings information (e.g., parental control ratings, critic's ratings, etc.), genre or category information, actor information, logo data for broadcasters' or providers' logos, year of release, runtime (length), episodic subtitles, closed-captioning information, bonus features (e.g., clips), behind-the-scenes clips, images, etc.), media format (e.g., standard definition, high definition, audio quality, etc.), advertisement information (e.g., text, images, media clips, etc.), on-demand information, and any other type of guidance data that is helpful for a user to navigate among and locate desired media selections.

Figure 2:
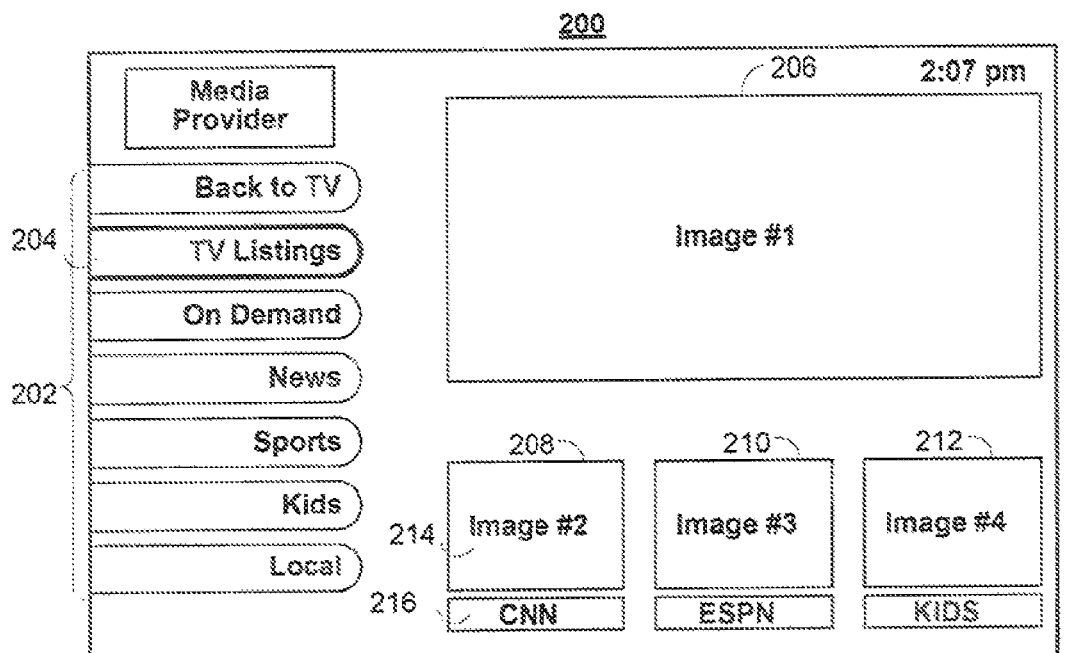
FIG. 2 illustrates an example of a mosaic display in an interactive media guidance application in accordance with some embodiments of the present invention.

FIGS. 1-2 show illustrative display screens that may be used to provide media guidance, and in particular media listings. The display screens shown in FIGS. 1-7 may be implemented on any suitable device or platform. While the displays of FIGS. 1-7 are illustrated as full screen displays, they may also be fully or partially overlaid over media content being displayed. A user may indicate a desire to access media guidance data by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, a media guidance application may provide a display screen with media guidance data organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time.

With a user input device, a user can select program listings by moving highlight region 110. For example, a user can select program listings by pressing an arrow button on a remote control to move the highlight region in a corresponding direction and by pressing a select button on the remote control. As another example, a user can select program listings by moving a motion-sensitive controller (e.g., one incorporating one or more accelerometers for detecting motion) in a direction corresponding to a desired movement of the highlight region and by pressing a button on the controller. As still another example, a user can select program listings by pointing a direction-sensitive controller (e.g., one that interacts with a direction sensitive receiver on or near a display and/or that incorporates one or more accelerometers for detecting motion) and pressing a button on the controller.

Information relating to the program listing selected by highlight region 110 may be provided in program information region 112. Region 112 may include, for example, the program title, the program description, the time the program is provided (if applicable), the channel the program is on (if applicable), the program's rating, the elapsed time of the program, and other desired media-related information (which is described in further detail below in connection with FIG. 10).

Although listings providing the title of a corresponding program are illustrated in cells of grid 102 of FIG. 1, these cells may include any additional or alternative guidance data related to media content, such as, for example, an actor name, a logo, a picture, an icon, a video clip, a rating, a program description, etc.

In addition to providing access to linear programming provided according to a schedule, a media guidance application may also provide access to non-linear programming which is not provided according to a schedule. Non-linear programming may include content from different media sources including on-demand media content (e.g., video-on-demand (VOD)), Internet content (e.g., streaming media, downloadable media, etc.), locally stored media content (e.g., video content stored on a digital video recorder (DVR), digital video/versatile disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND, THE SOPRANOS, and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g., FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed may be based on user selection or guidance application definition (e.g., a display of only recorded and broadcast listings, only on-demand and broadcast listings, etc.), and any suitable permutation may be used. As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. Patent Application Publication No. 2003/0110499 A1, published Jun. 12, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting a program and/or channel as a favorite, purchasing a program, or other features. Options available from a main menu display may include search options, VOD options, parental control options, options to access to various types of listing displays, options to subscribe to a premium service, options to edit a user's profile, options to access a browse overlay, or other options.

The media guidance application may be personalized based on a user's preferences. A personalized media guidance application may allow a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 10. Additional personalized media guidance application features are described in greater detail in Ellis et al., U.S. Patent Application Publication No. 2005/0251827 A1, published Nov. 10, 2005, Boyer et al., U.S. Pat. No. 7,165,098, issued Jan. 16, 2007, and Ellis et al., U.S. Patent Application Publication No. 2002/0174430 A1, published Nov. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing guidance data 206, 208, 210, and 212 as broadcast program guidance data. The guidance data in display 200 is not limited to simple text (e.g., the program title) and icons to describe media. Rather, in display 200 the guidance data may provide graphical images including cover art, still images from the media content, video clip previews, live video from the media content, or other types of media that indicate to a user the media content being described by the guidance data. Each of the graphical guidance data may also include text to provide further information about the media content associated with the guidance data. For example, guidance data 208 may include more than one portion, including media portion 214 and text portion 216. Media portion 214 and/or text portion 216 may be selectable to view video in full-screen or to view guidance data related to the video displayed in media portion 214 (e.g., to view guidance data for the channel that the video is displayed on).

The guidance data in display 200 are illustrated as being of different sizes (i.e., guidance data 206 is larger than guidance data 208, 210, and 212), but if desired, all the guidance data may be the same size. Guidance data may be of different sizes or graphically accentuated to indicate degrees of interest to the user or to emphasize certain content, as desired by the media provider or based on user preferences. Various systems and methods for graphically accentuating media guidance data are discussed in, for example, Yates, U.S. patent application Ser. No. 11/324,202, filed Dec. 29, 2005, which is hereby incorporated by reference herein in its entirety.

Figure 3A:
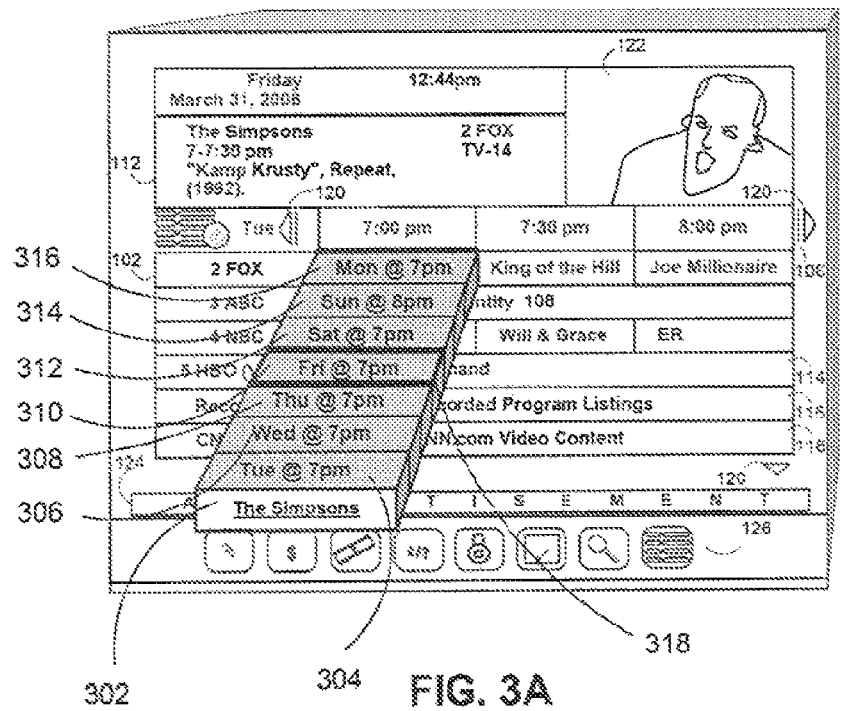
FIG. 3A illustrates an example of a three-dimensional portion in an interactive media guidance application, with sections identifying days and times for the airing of related media content, in accordance with some embodiments of the present invention.

Turning to FIG. 3A, yet another display arrangement 300 for media guidance is shown. As illustrated, arrangement 300 includes a three-dimensional (3D) portion 302 that appears to come out of the location of a listing in the two-dimensional (2D) display illustrated in FIG. 1. 3D portion 302 may be presented at any suitable time or in response to any suitable event. For example, 3D portion 302 may be presented when a user selects a listing in cell 108 of FIG. 1. As another example, 3D portion 302 may be presented when a user highlights a corresponding listing. As still another example, 3D portion 302 may be presented for a listing corresponding to media content being presented when a user activates an interactive media guidance application.

As can be seen in FIG. 3A, 3D portion 302 may include sections 304, 306, 308, 310, 312, 314, and 316. Each of these sections may present any suitable guidance data related to the corresponding listing in the 2D display. For example, as shown, these sections may include day, date, and/or time guidance data corresponding to when the same program series will be available for presentation. Thus, as illustrated, in addition to "The Simpsons" being available to be viewed on Tuesday at 7 pm, it may also be available to be viewed on Wednesday at 7 pm, Thursday at 7 pm, Friday at 7 pm, Saturday at 7 pm, Sunday at 8 pm, and Monday at 7 pm as respectively indicated by sections 306, 308, 310, 312, 314, and 316. "THE SIMPSONS" is a trademark owned by Fox Broadcasting Company.

As also illustrated in FIG. 3A, in some embodiments, a user may highlight a section 310 with a highlight region 318 so that any suitable subsequent action can be taken with respect to media content corresponding to the guidance data in that section. For example, a user may highlight section 310 so that a reminder can be set to watch "The Simpsons" on Friday at 7 pm. Any suitable technique may be used to highlight a section of a 3D portion. For example, a user may move a highlight region by repeatedly pressing an "in" or "out" button, which represent movement in depth. As another example, a user may use an input device that is sensitive to movement in three dimensions (e.g., by using one or more accelerometers sensitive to forces in three dimensions) and move the input device in a direction corresponding to the desired movement of a highlight region. As still another example, a user can move a highlight region by pointing a direction-sensitive controller (e.g., one that interacts with a direction sensitive receiver on or near a display and/or that incorporates one or more accelerometers for detecting motion) at the desired section and pressing a button on the controller.

Figure 3B:
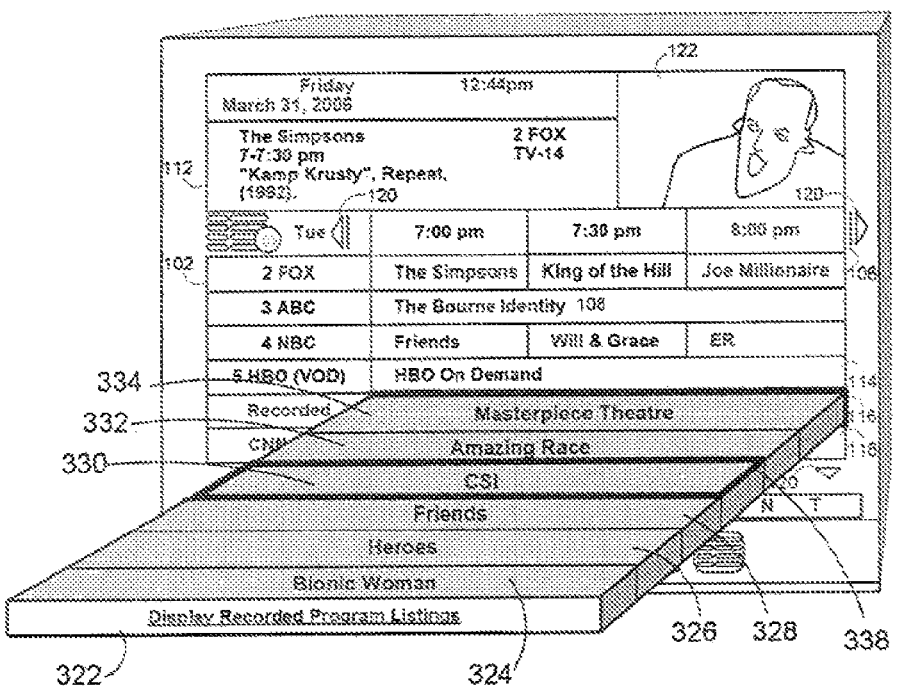
FIG. 3B illustrates an example of a three-dimensional portion in an interactive media guidance application, with sections identifying guidance data for recorded media content, in accordance with some embodiments of the present invention.

Another type of guidance data that may be displayed in a 3D portion is shown in display 320 of FIG. 3B. As illustrated, recorded programs corresponding to a recorded-programs listing highlighted by a user (for example) may be identified by guidance data in sections 324, 326, 328, 330, 332, and 334 of a 3D portion 322. These recorded programs may be any recorded programs available to a user. For example, the recorded programs may be manually recorded programs, programs automatically recorded, locally recorded programs, remotely recorded programs, etc. One of these sections may be selected using a highlight region 338.

Figure 4A:
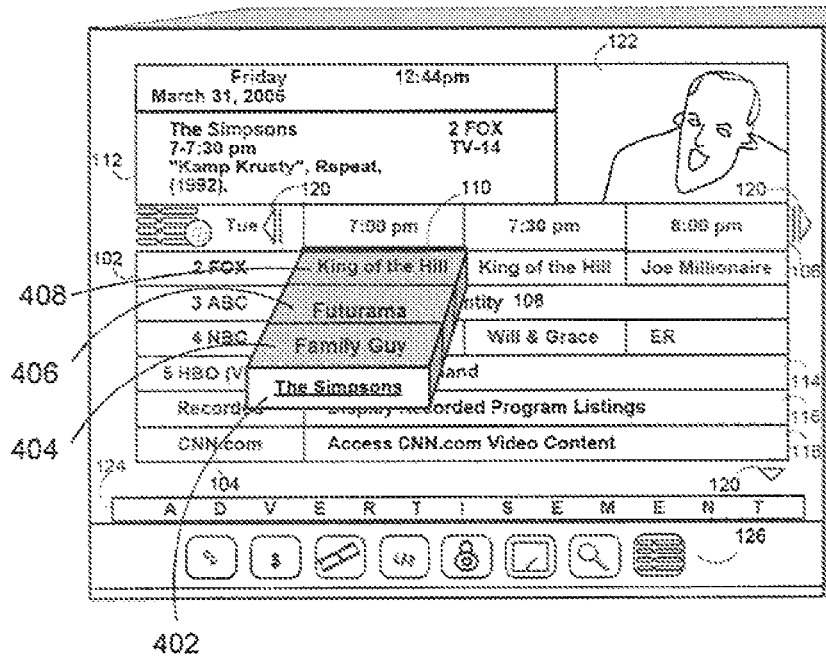
FIG. 4A illustrates an example of a three-dimensional portion in an interactive media guidance application, with sections identifying related media content in the same category, in accordance with some embodiments of the present invention.

Still another type of guidance data that may be displayed in a 3D portion is shown in display 400 of FIG. 4A. As illustrated, other programs in a same category (e.g., cartoons) as that corresponding to the listing highlighted by a user (for example) may be identified by guidance data in sections 404, 406, and 408 of a 3D portion 402. Any suitable categories or themes may be used in some embodiments to relate guidance data being displayed in a 3D portion of a guide to a corresponding listing in a 2D portion of the display.

Figure 4B:
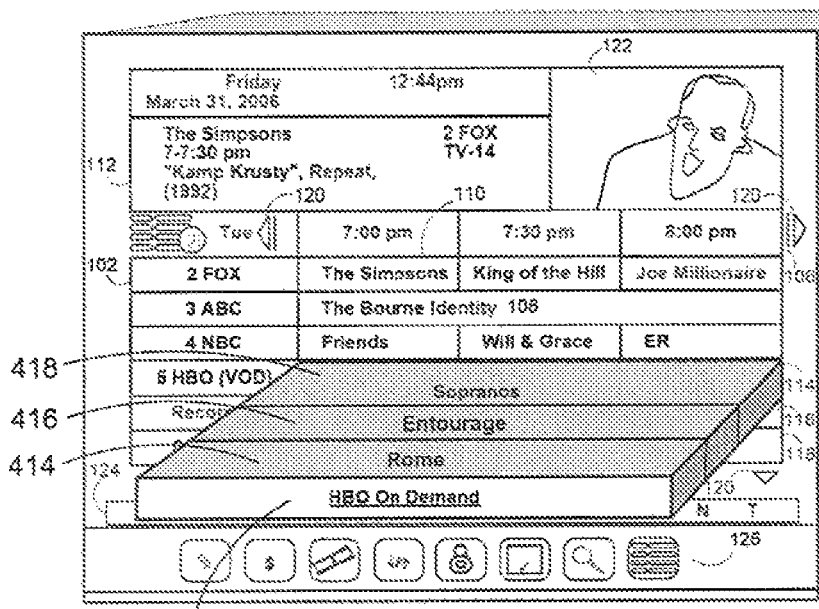
FIG. 4B illustrates an example of a three-dimensional portion in an interactive media guidance application, with sections identifying guidance data for on-demand media content, in accordance with some embodiments of the present invention.

Yet another type of guidance data that may be displayed in a 3D portion is shown in display 410 of FIG. 4B. As illustrated, the names of on-demand programs corresponding to an on-demand listing highlighted by a user (for example) can be identified by guidance data in sections 414, 416, and 418 of a 3D portion 412.

Figure 5A:
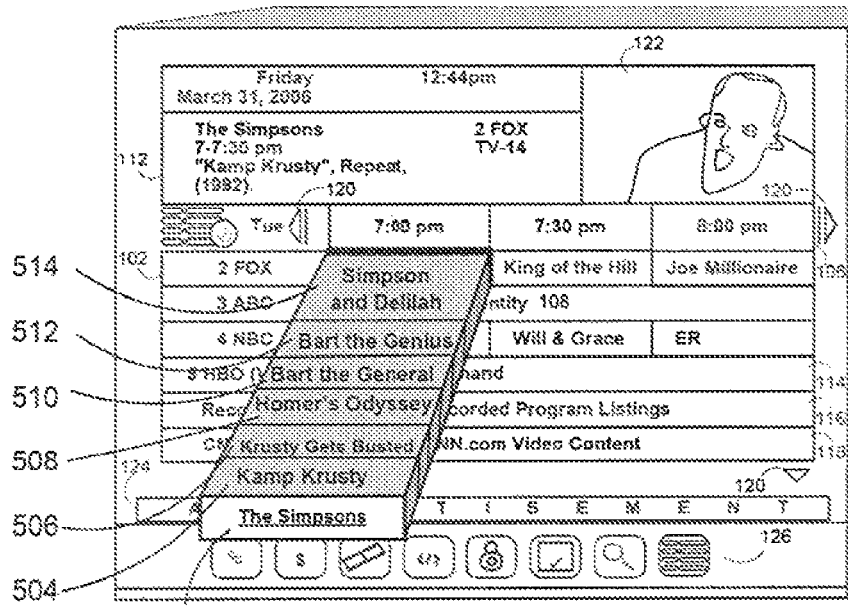
FIG. 5A illustrates an example of a three-dimensional portion in an interactive media guidance application, with sections identifying different episodes of a corresponding program, in accordance with some embodiments of the present invention.

Yet still another type of guidance data that may be displayed in a 3D portion is shown in display 500 of FIG. 5A. As illustrated, the names of other episodes of the program corresponding to a listing highlighted by a user (for example) can be identified by guidance data in sections 504, 506, 508, 510, 512, and 514 of a 3D portion 502.

Figure 5B:
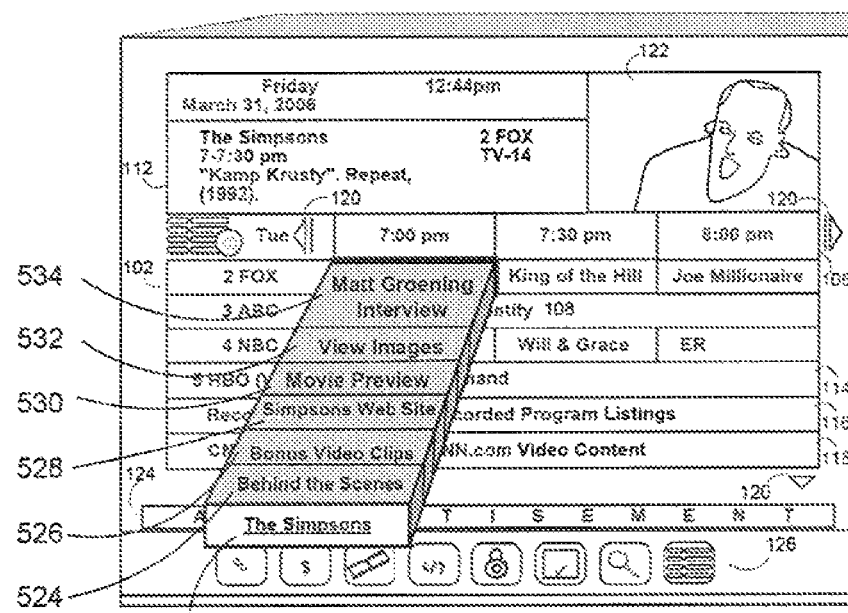
FIG. 5B illustrates an example of a three-dimensional portion in an interactive media guidance application, with sections identifying additional media content of a corresponding program, in accordance with some embodiments of the present invention.

Yet still another type of guidance data that may be displayed in a 3D portion is shown in display 520 of FIG. 5B. As illustrated, additional content (such as interviews, images, previews or trailers, Web sites, video clips, behind-the-scenes videos, etc.) related to media content corresponding to a highlighted listing may be represented by guidance data in sections 524, 526, 528, 530, 532, and 534 of a 3D portion 522.

Figure 6A:
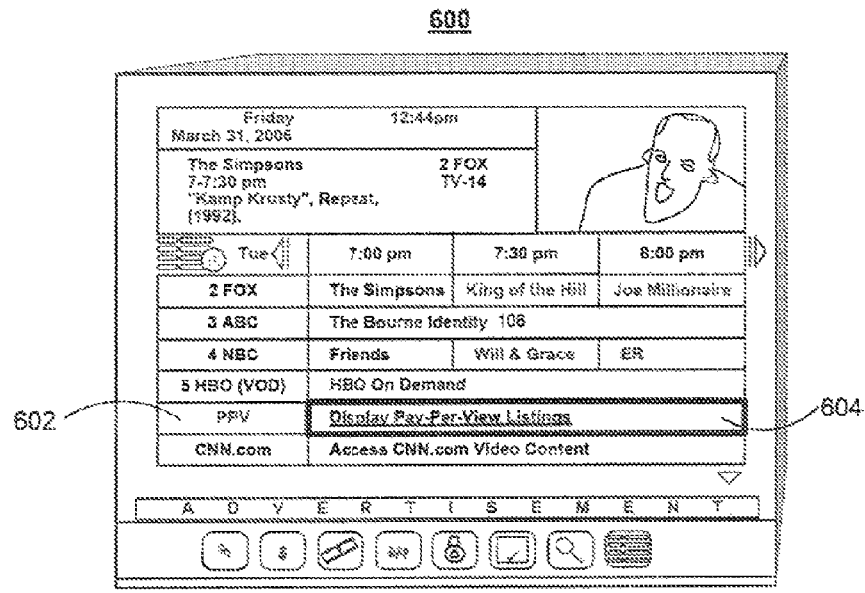
FIG. 6A illustrates an example of a grid display with a virtual channel in an interactive media guidance application in accordance with some embodiments of the present invention.

Turning to FIG. 6A, another type of listing is illustrated in display 600 in accordance with some embodiments. As shown, a listing 604 may represent multiple channels that have been consolidated into a single listing corresponding to a virtual channel 602. For example, with multiple pay-perview channels, the channels may be consolidated into a single listing to simplify the guide for a user. As another example, with multiple sports or music channels, the channels may be consolidated into a single listing. Obviously, any suitable channels may be consolidated into a virtual channel and whether channels are consolidated may be determined automatically or may be specified by a user.

Figure 6B:
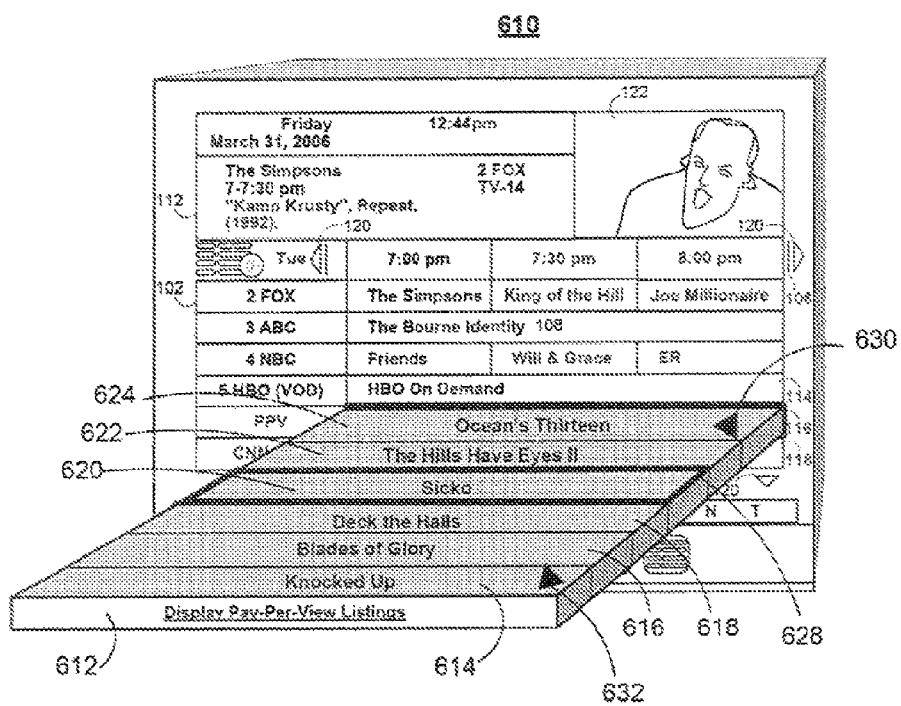
FIG. 6B illustrates an example of a three-dimensional portion in an interactive media guidance application, with sections identifying different channels corresponding to a virtual channel, in accordance with some embodiments of the present invention.

As shown in FIG. 6B, if a user (for example) selects a listing 604 (FIG. 6A), guidance data for programs available on the consolidated channels related to the listing may be presented in a 3D portion 612. For example, as illustrated, sections 614, 616, 618, 620, 622, and 624 may display the titles of pay-per-view programs that may be available on different channels. The channel numbers for the consolidated channels may additionally be displayed in these sections in some embodiments. A user may highlight a section using a highlight region 628 and/or scroll to other sections that are available for the 3D portion, but not shown, by moving the highlight region forward/in or backward/out. Indicators 630 and/or 632 may be used to represent that additional sections of guidance data are available.

Obviously, any other suitable relationship to a selected listing may be used to select related guidance data to be presented in sections of a 3D portion of a guide. For example, related guidance data may be related to a selected listing based on having a common or similar actor, having a common or similar cast, having a common or similar director, having a common or similar musical artist, having a common or similar sponsor, having a common or similar name, being part of the same or a similar series, being for the same or similar media content, having a common or similar metadata term, having a common or similar category or theme, and/or having any other suitable relationship.

In some embodiments, each of multiple buttons on a remote control may be used to specify a relationship for selecting related guidance data. For example, after highlighting a listing, a user may press one button to find different episodes of the same media content corresponding to the highlighted listing, another button to find other media content with the same actor as that in the media content corresponding to the highlighted listing, etc. In some embodiments, movement of a motion sensitive controller may similarly be used to specify a relationship for selecting related guidance data. For example, after a user highlights a listing, a user may move the controller toward the display to find different episodes of the same media content corresponding to the highlighted listing, may move the controller away from the display to find other media content with the same actor as that in the media content corresponding to the highlighted listing, may rotate, spin, or shake the controller for other relationships, etc.

Figure 7:
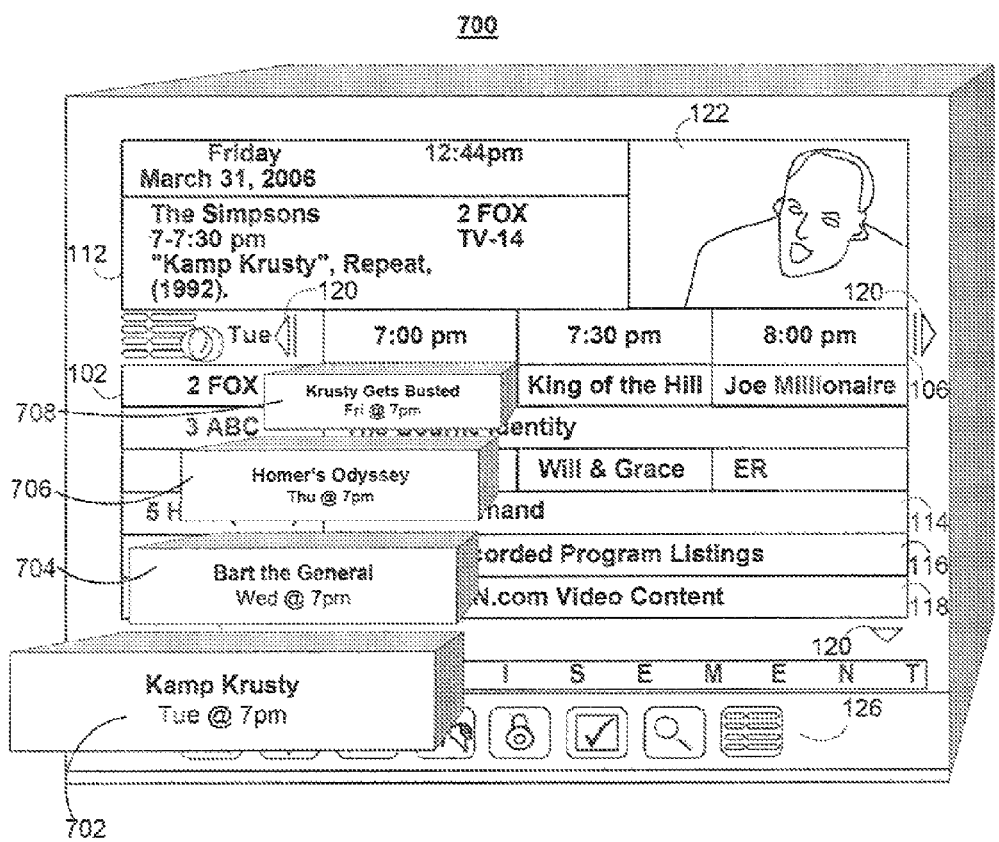
FIG. 7 illustrates an example of objects arranged in three dimensions in an interactive media guidance application in accordance with some embodiments of the present invention.

In some embodiments, rather than having a single 3D portion, one or more 2D or 3D objects may be displayed so as to give an appearance that the objects are situated in 3D space. For example, as shown in FIG. 7, objects 702, 704, 706, and 708 may be presented so as to give an appearance of coming out of cell 108 of FIG. 1. Any suitable guidance data may be presented on these objects. For example, both episode titles and air times (e.g., day and time as shown) may be presented for various episodes of "The Simpsons" series identified by the listing in cell 108 of FIG. 1.

Although 3D portions 302, 322, 402, 412, 502, 522, and 612 in FIGS. 3A, 3B, 4A, 4B, 5A, 5B, and 6B are each illustrated as single rectangular blocks, any suitable 3D shape may be presented as a 3D portion in accordance with some embodiments. Similarly, although objects 702, 704, 706 and 708 represent a series of four rectangular blocks, any suitable number of any suitable 2D or 3D shapes may be presented so as to give the appearance of being in three dimensions in accordance with some embodiments. For example, file cards (e.g., which may appear as being 2D objects) may be presented so as to give the appearance of being stacked in three dimensions in some embodiments.

Referring back to FIG. 1, in some embodiments, to indicate that related listings for a listing in cell 108 are available, the cell may include an indicator 128. This indicator may thus be used to alert a user to the opportunity to select cell 108 (for example) to see related listings in 3D portion 302, 322, 402, 412, 502, 522, or 612, or in objects 702, 704, 706, and/or 708.

Figure 8:
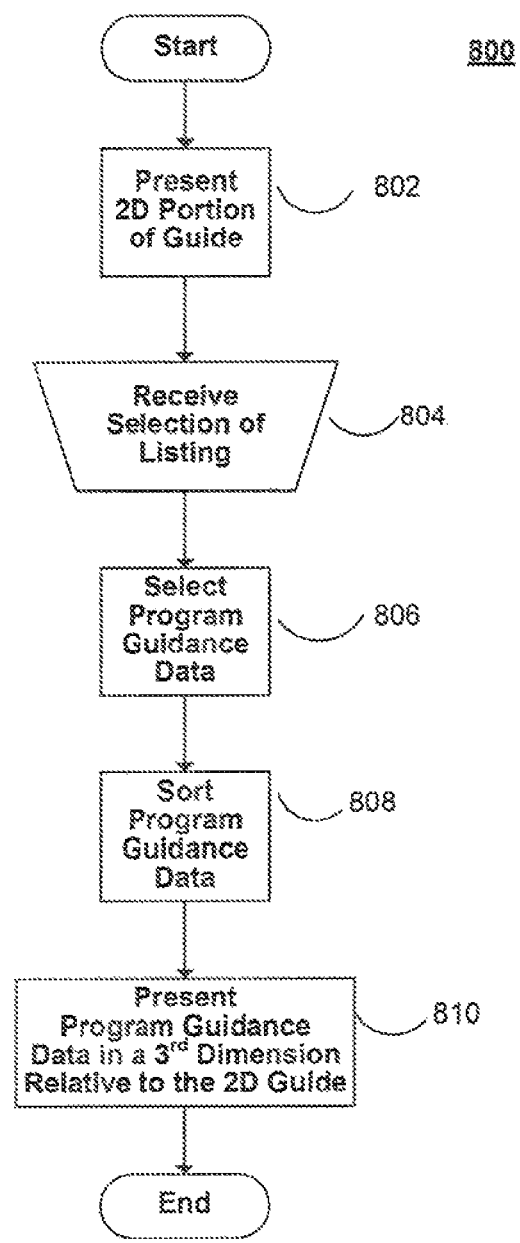
FIG. 8 illustrates an example of a process for implementing an interactive media guidance application having three dimensions in accordance with some embodiments of the present invention.

Turning to FIG. 8, a process 800 for presenting a third dimension in an interactive media guidance application is illustrated. As shown, a 2D portion of a guide may first be presented at step 802. This portion of the guide may be presented in any suitable fashion and may include any suitable features, for example as described above in connection with FIGS. 1 and 2. Next, at step 804, a user selection of a listing in the 2D portion of the display may be received. This selection may be made in any suitable manner as described above in connection with FIGS. 1 and 2. For example, a user may select a listing in a cell of a 2D portion of a display by highlighting the cell and pressing a button on a remote control.

Next, at step 806, guidance data related to the selected listing may be selected. This related guidance data may be selected based on any suitable relationship. For example, as mentioned above, guidance data may be related to a selected listing based on having a common or similar actor, having a common or similar cast, having a common or similar director, having a common or similar musical artist, having a common or similar sponsor, having a common or similar name, being part of the same or a similar series, being for the same or similar media content, having a common or similar metadata term, having a common or similar category or theme, and/or having any other suitable relationship.

The selected guidance data may then be sorted at step 808. This sorting may be based on any suitable attribute or attributes of the related guidance data or media content associated with the related guidance data. For example, related guidance data may be sorted by an air day and time for media content associated with the related guidance data as illustrated in FIG. 3A. As another example, related guidance data may be sorted alphabetically as illustrated in FIG. 4A. As another example, related guidance data may be sorted based on a category (or other categorization attribute) associated with media content associated with the related guidance data. As still another example, related guidance data may be sorted by the relevance of the related guidance data to the selected listing. As a more particular example, this relevance may be based on how many aspects of the related guidance data are common to the selected listing. As another more particular example, this relevance may be based on the number of previous users that selected the related guidance data, or the number of previous times the related guidance data was selected, when presented in a 3D portion for the same selected listing.

At step 810, the related guidance data may be presented so as to have the appearance of being in a third dimension relative to the 2D display. This presentation may be accomplished in any suitable manner. For example, this presentation may be accomplished as illustrated above in connection with FIGS. 3A, 3B, 4A, 4B, 5A, 5B, and 6B.

Figure 9:
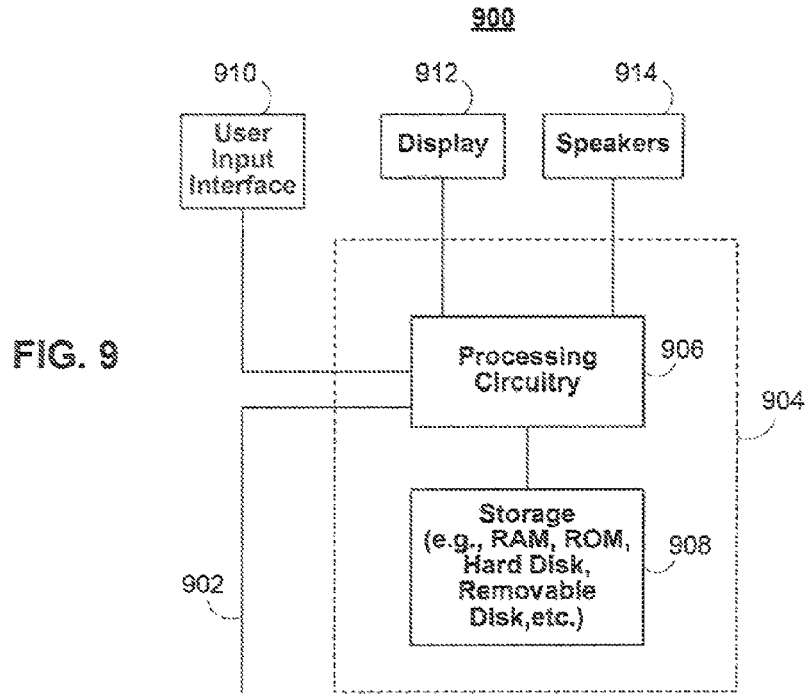
FIG. 9 illustrates an example of user equipment devices the may be used to implement an interactive media guidance application in accordance with some embodiments of the present invention.

Users may access media content and the media guidance application (and its display screens described above and below) from one or more of their user equipment devices. FIG. 9 shows a generalized embodiment of illustrative user equipment device 900. More specific implementations of user equipment devices are discussed below in connection with FIG. 10. User equipment device 900 may receive media content and data via input/output (hereinafter "I/O") path 902. I/O path 902 may provide media content (e.g., broadcast programming, on-demand programming, Internet content, and other video or audio) and data to control circuitry 904, which includes processing circuitry 906 and storage 908. Control circuitry 904 may be used to send and receive commands, requests, and other suitable data using I/O path 902. I/O path 902 may connect control circuitry 904 (and specifically processing circuitry 906) to one or more communications paths (described below). I/O functions may be provided by one or more of these communications paths, but are shown as a single path in FIG. 9 to avoid overcomplicating the drawing.

Control circuitry 904 may be based on any suitable processing circuitry 906 such as processing circuitry based on one or more microprocessors, microcontrollers, digital signal processors, programmable logic devices, etc. In some embodiments, control circuitry 904 executes instructions for a media guidance application stored in memory (i.e., storage 908). In client-server based embodiments, control circuitry 904 may include communications circuitry suitable for communicating with a guidance application server or other networks or servers. Communications circuitry may include a cable modem, an integrated services digital network (ISDN) modem, a digital subscriber line (DSL) modem, a telephone modem, a wireless modem for communications with other equipment, a fiber-optic communications interface, a network interface (e.g., for an Ethernet network), and/or any other suitable interface. Such communications may involve the Internet or any other suitable communications networks or paths (which is described in more detail in connection with FIG. 10). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 908 that is part of control circuitry 904. Storage 908 may include one or more of the above types of storage devices. For example, user equipment device 900 may include a hard drive for a DVR (sometimes called a personal video recorder, or PVR) and a DVD recorder as a secondary storage device. Storage 908 may be used to store various types of media described herein and guidance application data, including program information, guidance application settings, user preferences or profile information, or other data used in operating the guidance application. Non-volatile memory may also be used (e.g., to launch a boot-up routine and other instructions).

Control circuitry 904 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 904 may also include scaler circuitry for upconverting and downconverting media into the preferred output format of the user equipment 900. Circuitry 904 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from user equipment 900, the tuning and encoding circuitry (including multiple tuners) may be associated with storage 908.

A user may control the control circuitry 904 using user input interface 910. User input interface 910 may be any suitable user interface, such as a remote control, mouse, trackball, keypad, keyboard, touch screen, touch pad, stylus input, joystick, motion sensitive controller (e.g., incorporating one or more accelerometers sensitive to forces in three dimensions), voice recognition interface, or other user input interfaces. Display 912 may be provided as a stand-alone device or integrated with other elements of user equipment device 900. Display 912 may be one or more of a monitor, a television, a liquid crystal display (LCD) for a mobile device, or any other suitable equipment for displaying visual images. In some embodiments, display 912 may be HDTV-capable. Speakers 914 may be provided as integrated with other elements of user equipment device 900 or may be stand-alone units. The audio component of videos and other media content displayed on display 912 may be played through speakers 914. In some embodiments, the audio may be distributed to a receiver (not shown), which processes and outputs the audio via speakers 914.

Figure 10:
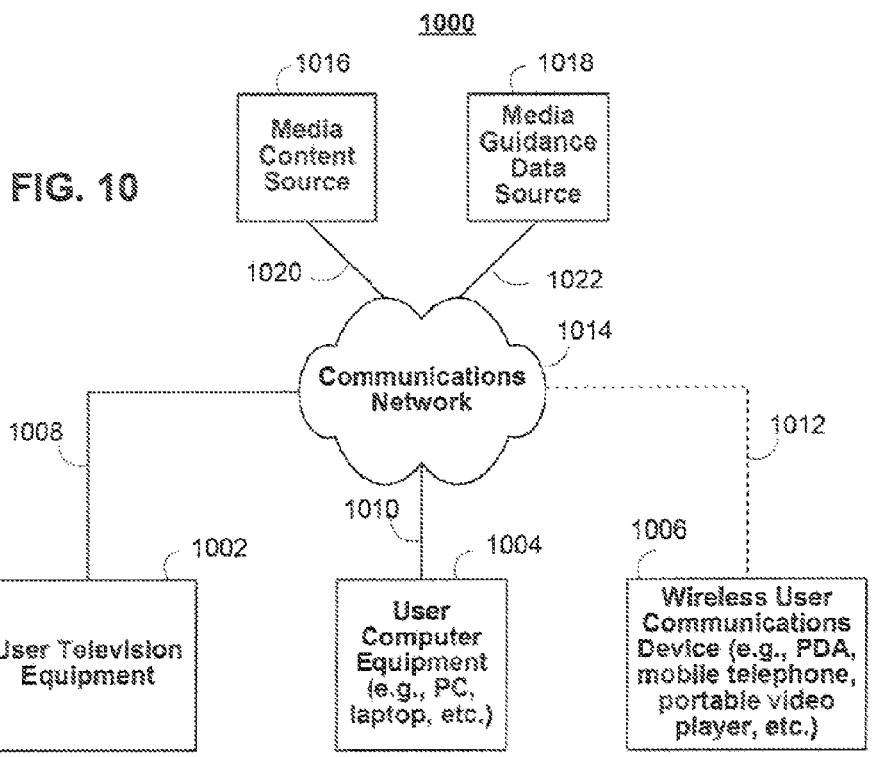
FIG. 10 illustrates an example of a system for implementing an interactive media guidance application in accordance with some embodiments of the present invention.

User equipment device 900 of FIG. 9 can be implemented in system 1000 of FIG. 10 as user television equipment 1002, user computer equipment 1004, wireless user communications device 1006, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 1002 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 1004 may include a PC, a laptop, a tablet, a WebTV box, a personal computer television (PC/TV), a PC media server, a PC media center, or other user computer equipment. WEBTV (now known as MSN TV) is a trademark owned by Microsoft Corp. Wireless user communications device 1006 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 1002, user computer equipment 1004, and wireless user communications device 1006 may utilize at least some of the system features described above in connection with FIG. 9 and, as a result, include flexibility with respect to the type of media content available on the device. For example, user television equipment 1002 may be Internet-enabled allowing for access to Internet content, while user computer equipment 1004 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 1000, there is typically more than one of each type of user equipment device but only one of each is shown in FIG. 10 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to control, and/or maintain consistent media guidance application settings across, in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel may appear as a favorite on the user's in-home devices (e.g., user television equipment and user computer equipment) as well as the user's mobile devices, if desired. As another example, a user may specify using one device (e.g., a portable device or one mounted in the user's automobile) that a program is to be recorded on another of the user's devices (e.g., the user's home device). Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1014. Namely, user television equipment 1002, user computer equipment 1004, and wireless user communications device 1006 may be coupled to communications network 1014 via communications paths 1008, 1010, and 1012, respectively. Communications network 1014 may be one or more networks including the Internet, a mobile phone network, mobile device (e.g., Blackberry) network, cable network, public switched telephone network, or other types of communications network or combinations of communications networks. BLACKBERRY is a trademark owned by Research In Motion Limited Corp. Paths 1008, 1010, and 1012 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1012 is drawn with dotted lines to indicate that in the exemplary embodiment shown in FIG. 10 it is a wireless path and paths 1008 and 1010 are drawn as solid lines to indicate they are wired paths (although these paths may be wireless paths, if desired). Communications with the user equipment devices may be provided by one or more of these communications paths, but are shown as a single path in FIG. 10 to avoid overcomplicating the drawing.

Although communications paths are not drawn between user equipment devices, these devices may communicate directly with each other via communication paths, such as those described above in connection with paths 1008, 1010, and 1012, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a trademark owned by Bluetooth SIG, INC. The user equipment devices may also communicate with each other directly through an indirect path via communications network 1014.

System 1000 includes media content source 1016 and media guidance data source 1018 coupled to communications network 1014 via communication paths 1020 and 1022, respectively. Paths 1020 and 1022 may include any of the communication paths described above in connection with paths 1008, 1010, and 1012. Communications with the media content source 1016 and media guidance data source 1018 may be exchanged over one or more communications paths, but are shown as a single path in FIG. 10 to avoid overcomplicating the drawing. In addition, there may be more than one of each of media content source 1016 and media guidance data source 1018, but only one of each is shown in FIG. 10 to avoid overcomplicating the drawing. (The different types of each of these sources are discussed below.) If desired, media content source 1016 and media guidance data source 1018 may be integrated as one source device. Although communications between sources 1016 and 1018 with user equipment devices 1002, 1004, and 1006 are shown as through communications network 1014, in some embodiments, sources 1016 and 1018 may communicate directly with user equipment devices 1002, 1004, and 1006 via communication paths (not shown) such as those described above in connection with paths 1008, 1010, and 1012.

Media content source 1016 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 1016 may be the originator of media content (e.g., a television broadcaster, a Webcast provider, etc.) or may not be the originator of media content (e.g., an on-demand media content provider, an Internet provider of video content of broadcast programs for downloading, etc.). Media content source 1016 may include cable sources, satellite providers, on-demand providers, Internet providers, or other providers of media content. Media content source 1016 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. Patent Application Publication No. 2003/0149988 A1, published Aug. 7, 2003, which is hereby incorporated by reference herein in its entirety.

Media guidance data source 1018 may provide media guidance data, such as media listings (or program listings), media-related information (or media information or program information) (e.g., broadcast times, broadcast channels, media titles, media descriptions, ratings information (e.g., parental control ratings, critic's ratings, etc.), genre or category information, actor information, logo data for broadcasters' or providers' logos, year of release, runtime (length), episodic subtitles, closed-captioning information, bonus features (e.g., clips), behind-the-scenes clips, images, etc.), media format (e.g., standard definition, high definition, audio quality, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel).

Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 1018 may be provided to users' equipment using a client-server approach. For example, a guidance application client residing on the user's equipment may initiate sessions with source 1018 to obtain guidance data when needed. Media guidance data source 1018 may provide user equipment devices 1002, 1004, and 1006 the media guidance application itself or software updates for the media guidance application.

Media guidance applications may be, for example, standalone applications implemented on user equipment devices. In other embodiments, media guidance applications may be client-server applications where only the client resides on the user equipment device. For example, media guidance applications may be implemented partially as a client application on control circuitry 904 of user equipment device 900 and partially on a remote server as a server application (e.g., media guidance data source 1018). The guidance application displays may be generated by the media guidance data source 1018 and transmitted to the user equipment devices. The media guidance data source 1018 may also transmit data for storage on the user equipment, which then generates the guidance application displays based on instructions processed by control circuitry.

Media guidance system 1000 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 10.

In one approach, user equipment devices may communicate with each other within a home network. User equipment devices can communicate with each other directly via short-range point-to-point communication schemes described above, via indirect paths through a hub or other similar device provided on a home network, or via communications network 1014. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Application Publication No. 2005/0251827 A1, published Nov. 10, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access a media guidance application on a website via a personal computer at their office, on a mobile device such as a PDA or web-enabled mobile telephone, on a vehicle-based system that is part of or coupled to a navigation system, etc. The user may set various settings (e.g., recordings, reminders, or other settings) on the guidance application to control the user's in-home equipment. The guide may control the user's equipment directly, or by communicating with a media guidance application on the user's in-home equipment. Various systems and methods for user equipment devices communicating, where the user equipment devices are in locations remote from each other, are discussed in, for example, Ellis et al., U.S. Patent Application Publication No. 2005/0028208 A1, published Feb. 3, 2005, which is hereby incorporated by reference herein in its entirety.

In a third approach, users of user equipment devices inside and outside a home can use their media guidance application to communicate directly with media content source 1016 to access media content. Specifically, within a home, users of user television equipment 1002 and user computer equipment 1004 may access the media guidance application to navigate among and locate desirable media content. Users may also access the media guidance application outside of the home using wireless user communications devices 1006 to navigate among and locate desirable media content.

It will be appreciated that while the discussion of media content has focused on video content, the principles of media guidance can be applied to other types of media content, such as music, images, etc.

Thus, it is seen that methods and systems for presenting guide listings in three dimensions in an interactive media guidance application are provided. One skilled in the art will appreciate that the invention can be practiced by other than the described embodiments, which are presented for purposes of illustration and not of limitation, that various features of the described embodiments can be interchanged and used in any suitable combination, and that the present invention is limited only by the claims which follow.

What is claimed is:

1. A method for presenting guide listings and guidance data in three dimensions in an interactive media guidance application, the method comprising:
   displaying, using a media equipment device, guide listings in a two-dimensional configuration;

receiving a user selection of one of the guide listings that is displayed in a location within the two-dimensional configuration;

identifying a plurality of items of guidance data related to the selection;

displaying the plurality of items of guidance data in a 3D portion, wherein the 3D portion appears to extend, in a third dimension relative to the two-dimensional configuration, from the location of the selected guide listing along a third dimension axis towards the user, wherein each of the items of guidance data in the 3D portion appears to be positioned along a common surface of the 3D portion and at a different depth along the third dimension axis from each other item relative to the user, and wherein a representation of the user selection is presented on a surface of the 3D portion that intersects a region of the common surface in which one of the items of guidance data is presented;

enabling a user to highlight an item of guidance data in the 3D portion so that a subsequent action can be taken with respect to media content corresponding to the highlighted item of guidance data; and performing an action corresponding to the highlighted item in response to receiving a user selection of the highlighted item.

2. The method of claim 1, wherein the interactive media guidance application is an interactive program guide.

3. The method of claim 1, wherein the two-dimensional configuration presents guide listings so that times related to the guide listings are indicated in a first dimension of two dimensions associated with the two-dimensional configuration.

4. The method of claim 1, wherein the two dimensional configuration presents guide listings so that sources of media related to the guide listings are indicated in a second dimension of two dimensions associated with the two-dimensional configuration.

5. The method of claim 1, wherein receiving the user selection of one of the guide listings comprises detecting a button depression on a remote control, and further comprising selecting the guidance data as being related to the selection based on which a plurality of buttons was depressed.

6. The method of claim 1, wherein receiving the user selection of one of the guide listings comprises detecting movement of a remote control, and further comprising selecting the guidance data as being related to the selection based on which a plurality of possible movements was detected.

7. The method of claim 1, wherein identifying the guidance data related to the selection comprises identifying guidance data corresponding to media that are part of a series corresponding to the selection.

8. The method of claim 1, wherein identifying the guidance data related to the selection comprises identifying guidance data corresponding to the same media to which the selection corresponds.

9. The method of claim 8, wherein the guidance data indicates presentation times that are different than a presentation time of the selection.

10. The method of claim 1, wherein identifying the guidance data related to the selection comprises identifying guidance data corresponding to other media that have at least one of the same actor, the same cast, the same producer, the same director, the same musical artist, the same sponsor, the same name, the same mecadata term, the same theme, and the same category as selected media corresponding to the selection.

11. The method of claim 1, further comprising sorting the guidance data.

12. The method of claim 11, wherein the guidance data is sorted by relevance.

13. The method of claim 1, wherein presenting items of guidance data so that the items of guidance data appear to be in the third dimension relative to the two-dimensional configuration comprises presenting the combination of the two-dimensional configuration and the third dimension of guidance data as having the appearance of a three-dimensional structure.

14. A device for presenting guide listings and guidance data in three dimensions in an interactive media guidance application, the device comprising:

processing circuitry that
causes guide listings to be presented in a two-dimensional configuration;

receives a user selection of one of the guide listings that is displayed in a location within the two-dimensional configuration;

identifies a plurality of items of guidance data related to the selection;

causes the plurality of items of guidance data to be presented in a 3D portion, wherein the 3D portion appears to extend, in a third dimension relative to the two-dimensional configuration, from the location of the selected guide listing along a third dimension axis towards the user, wherein each of the items of guidance data in the 3D portion appears to be positioned along a common surface of the 3D portion and at a different depth along the third dimension axis from each other item relative to the user, and wherein a representation of the user selection is presented on a surface of the 3D portion that intersects a region of the common surface in which one of the items of guidance data is presented;

enables a user to highlight an item of guidance data in the 3D portion so that a subsequent action can be taken with respect to media content corresponding to the highlighted item of the guidance data; and performs an action corresponding to the highlighted item in response to receiving a user selection of the highlighted item.

15. The device of claim 14, wherein the interactive media guidance application is an interactive program guide.

16. The device of claim 14, wherein the two-dimensional configuration presents guide listings so that times related to the guide listings are indicated in a first dimension of two dimensions associated with the two-dimensional configuration.

17. The device of claim 14, wherein the two dimensional configuration presents guide listings so that sources of media related to the guide listings are indicated in a second dimension of two dimensions associated with the two-dimensional configuration.

18. The device of claim 14, wherein the processing circuitry, in receiving the user selection of one of the guide listings, also detects a button depression on a remote control and selects the guidance data as being related to the selection based on which a plurality of buttons was depressed.

19. The device of claim 14, wherein the processing circuitry, in receiving the user selection of one of the guide listings, also detects movement of a remote control and selects the guidance data as being related to the selection based on which a plurality of possible movements was detected.

20. The device of claim 14, wherein the Processing circuitry, in identifying the guidance data related to the selection, also identifies guidance data corresponding to media that are part of a series corresponding to the selection.

21. The device of claim 14, wherein the processing circuitry, in identifying the guidance data that are related to the selection, also identifies guidance data corresponding to the same media to which the selection corresponds.

22. The device of claim 21, wherein the guidance data indicate presentation times that are different than a presentation time of the selection.

23. The device of claim 14, wherein the processing circuitry, in identifying the guidance data related to the selection, also identifies guidance data corresponding to other media that have at least one of the same actor, the same cast, the same producer, the same director, the same musical artist, the same sponsor, the same name, the same metadata term, the same theme, and the same category as selected media corresponding to the selection.

24. The device of claim 14, wherein the processing circuitry also sorts the guidance data.

25. The device of claim 24, wherein the guidance data is sorted by relevance.

26. The device of claim 14, wherein the processing circuitry, in causing items of guidance data to be presented so that the items of guidance data appear to be in the third dimension relative to the two-dimensional configuration, also presents the combination of the two-dimensional configuration and the third dimension of guidance data as having the appearance of a three-dimensional structure.

27. A device for presenting guide listings and guidance data in three dimensions in an interactive media guidance application, the device comprising:
means for causing guide listings to be presented in a two-dimensional configuration;
means for receiving a user selection of one of the guide listings that is displayed in a location within the two-dimensional configuration;
means for identifying a plurality of items of guidance data related to the selection;
means for causing the plurality of items of guidance data to be presented in a 3D portion, wherein the 3D portion appears to extend, in a third dimension relative to the two-dimensional configuration, from the location of the selected guide listing along a third dimension axis towards the user, wherein each of the items of guidance data in the 3D portion appears to be positioned along a common surface of the 3D portion and at a different depth along the third dimension axis from each other item relative to the user, and wherein a representation of the user selection is presented on a surface of the 3D portion that intersects a region of the common surface in which one of the items of guidance data is presented;
means for enabling a user to highlight an item of guidance data in the 3D portion so that a subsequent action can be taken with respect to media content corresponding to the highlighted item of the guidance data; and
means for performing an action corresponding to the highlighted item in response to receiving a user selection of the highlighted item.

28. The device of claim 27, wherein the interactive media guidance application is an interactive program guide.

29. The device of claim 27, wherein the two-dimensional configuration presents guide listings so that times related to the guide listings are indicated in a first dimension of two dimensions associated with the two-dimensional configuration.

30. The device of claim 27, wherein the two dimensional configuration presents guide listings so that sources of media related to the guide listings are indicated in a second dimension of two dimensions associated with the two-dimensional configuration.

31. The device of claim 27, wherein the means for receiving the user selection of one of the guide listings also detects a button depression on a remote control and selects the guidance data as being related to the selection based on which a plurality of buttons was depressed.

32. The device of claim 27, wherein the means for receiving the user selection of one of the guide listings also detects movement of a remote control and selects the guidance data as being related to the selection based on which a plurality of possible movements was detected.

33. The device of claim 27, wherein the means for identifying the guidance data that are related to the selection also identifies guidance data corresponding to media that are part of a series corresponding to the selection.

34. The device of claim 27, wherein the means for identifying the guidance data that are related to the selection also identifies guidance data corresponding to the same media to which the selection corresponds.

35. The device of claim 34, wherein the guidance data indicates presentation times that are different than a presentation time of the selection.

36. The device of claim 27, wherein the means for identifying the guidance data related to the selection also identifies guidance data corresponding to other media that have at least one of the same actor, the same cast, the same producer, the same director, the same musical artist, the same sponsor, the same name, the same metadata term, the same theme, and the same category as selected media corresponding to the selection.

37. The device of claim 27, further comprising means for sorting the guidance data.

38. The device of claim 37, wherein the guidance data is sorted by relevance.

39. The device of claim 27, wherein the means for causing items of guidance data to be presented so that the items of guidance data appear to be in the third dimension relative to the two-dimensional configuration also presents the combination of the two-dimensional configuration and the third dimension of guidance data as having the appearance of a three-dimensional structure.

40. The method of claim 1, wherein the guide listings include program listings and the guidance data includes information associated with a selected one of the program listings corresponding to the selected one of the guide listings.

41. The method of claim 1, wherein the action performed corresponding to the highlighted item comprises setting a reminder for the highlighted item.

42. The device of claim 14, wherein the action performed corresponding to the highlighted item comprises setting a reminder for the highlighted item.

43. The device of claim 27, wherein the action performed corresponding to the highlighted item comprises setting a reminder for the highlighted item.

44. The method of claim 1, wherein:
the plurality of items of guidance data in the list are displayed in a predetermined order; and
the highlighting of an item of guidance data is performed without modifying the predetermined order in which the items are displayed.

45. The device of claim 14, wherein:
the plurality of items of guidance data in the 3D portion are displayed in a predetermined order; and the highlighting of an item of guidance data is performed without modifying the predetermined order in which the items are displayed.

46. The device of claim 27, wherein:

the plurality of items of guidance data in the 3D portion are displayed in a predetermined order; and the highlighting of an item of guidance data is performed without modifying the predetermined order in which the items are displayed.

* * * * *